「United States Patent」

(12) United States Patent
You et al.

(10) Patent No.: US 7,586,556 B2
(45) Date of Patent: Sep. 8, 2009

(54) PORTABLE DISPLAY DEVICE

(75) Inventors: Young Min You, Ulsan (KR); Yang Han Son, Ulsan (KR); Jong Seon Woo, Ulsan (KR)

(73) Assignee: Samsung Mobile Co., Ltd., Yongin (KR)

( * ) Notice: Subject to any disclaimer, the term of this patent is extended or adjusted under 35 U.S.C. 154(b) by 311 days.

(21) Appl. No.: 11/545,981

(22) Filed: Oct. 10, 2006

(65) Prior Publication Data

US 2007/0126335 A1    Jun. 7, 2007

(30) Foreign Application Priority Data

Dec. 2, 2005    (KR)    ............... 10-2005-0117178

(51) Int. Cl.
*G02F 1/1333*    (2006.01)
*F21V 7/04*    (2006.01)
(52) U.S. Cl. .................. 349/58; 349/59; 349/60; 362/632; 362/633; 362/634
(58) Field of Classification Search .......... 349/58, 349/59, 60; 362/632–634
See application file for complete search history.

(56) References Cited

U.S. PATENT DOCUMENTS 5,166,815 A * 11/1992 Elderfield .............. 349/64
6,587,166 B1 * 7/2003 Lee et al. ............... 349/58
2003/0011736 A1 * 1/2003 Ha et al. ................. 349/149
2003/0169383 A1 * 9/2003 Kim ....................... 349/58
2004/0135936 A1 * 7/2004 Lee ........................ 349/64
2004/0150981 A1 * 8/2004 Katsuda et al. ......... 362/31

FOREIGN PATENT DOCUMENTS

KR    2003-0006103    1/2003
KR    2003-0054764    7/2003
KR    10-0460406    11/2004

OTHER PUBLICATIONS

Korean Patent Abstracts, Publication No. 1020030006103 A, dated Jan. 23, 2003, in the name of Myeong Gi Jang, et al.
Patent Abstracts of Korea for Publication No. 100460406; Date of Publication of Application Nov. 29, 2004 in the name of Kim.
Patent Abstracts of Korea for Publication No. 1020030054764; Date of Publication of Application Jul. 2, 2003 in the name of Lee et al.

* cited by examiner

*Primary Examiner*—Frank G Font
*Assistant Examiner*—Robert Tavlykaev
(74) *Attorney, Agent, or Firm*—Christie Parker & Hale LLP

(57) ABSTRACT

A portable display device includes a display panel, a backlight assembly having a light source for supplying light to the liquid crystal display panel and having a mold frame with a periphery step platform. A bottom chassis is combined with the mold frame, the bottom chassis having a bent unit surrounding the periphery step platform.

6 Claims, 5 Drawing Sheets

PORTABLE DISPLAY DEVICE

CROSS-REFERENCE TO RELATED APPLICATIONS

This application claims priority to and the benefit of Korean Patent Application Nos. 2005-117178, filed on Dec. 2, 2005, in the Korean Intellectual Property Office, the entire content of which is incorporated herein by reference.

BACKGROUND

1. Field of the Invention

The present invention relates to an improved portable display device, and more particularly to a portable display device with an enhanced stiffness.

2. Discussion of Related Art

Recently, various flat display devices have been developed having reduced weight and size. Exemplary flat display devices include a liquid crystal display, a field emission display, a plasma display panel, an organic light emitting display, etc. Specifically, liquid crystal displays have become popular due to their small size, light weight, and low power consumption. Liquid crystal displays may be mounted in large-sized television monitors as well as mobile phones and personal digital assistant (PDA).

FIG. 1 is an exploded prospective view illustrating a conventional portable display device. FIG. 2 is an assembled sectional view taken along line A-A' of the portable display device shown in FIG. 1.

Referring to FIGS. 1 and 2, the conventional portable display device includes a liquid crystal display panel 4, a backlight assembly 50, a bottom chassis 22, a first printed circuit board 24, a second printed circuit board 26, and a light-emitting display panel 30.

The liquid crystal display panel 4 displays predetermined images and includes a first substrate 4a, a second substrate 4b and a liquid crystal (not shown) injected between the first substrate 4a and the second substrate 4b.

The second substrate 4b includes a plurality of thin film transistors (TFTs) arranged in matrix form. A source electrode of the TFT is connected to a data line, and a gate electrode thereof is connected to a scan line. A drain electrode of the TFT is connected to a pixel electrode made of transparent indium tin oxide (ITO) of a conductive material. The TFT is turned on when the scan line is supplied with a scan signal, and supplies a data signal from the data line to the pixel electrode.

An integrated circuit 6 is inserted on one side of the second substrate 4b, and the data signal and scan signal are supplied from the integrated circuit 6. A protective layer 8 is deposited around the integrated circuit 6.

The first substrate 4a is arranged facing the second substrate 4b. A common electrode made of ITO is applied on a front surface of the first substrate 4a. The common electrode is applied with a predetermined voltage, to generate an electric field between the common electrode and the pixel electrode. The array angle of the liquid crystal injected between the first substrate 4a and the second substrate 4b varies with the electric field, and the optical transparency varies according to the array angle to thereby display desired images.

The backlight assembly 50 includes a mold frame 16, light emitting diodes (LEDs) 12, a LED substrate 14, a light guide plate 18, a reflective plate 20 and optical sheets 10.

The LEDs 12 emit a predetermined amount of light corresponding to a drive signal from the LED substrate 14. The light guide plate 18 supplies the light from the LEDs 12 to the liquid crystal display panel 4.

The reflective plate 20 arranged on the back surface of the light guide plate 18 reflects incidence light from the light guide plate 18 back onto the light guide plate, thereby improving optical efficiency.

The optical sheets 10 enhance the amount of light from the light guide plate 18 to the liquid crystal display panel 4.

The LED substrate 14 connected to the first printed circuit board 24 supplies the drive signal to the LEDs 12 corresponding to control signal from the first printed circuit board 24.

The LED substrate 14 mounted with LEDs 12 is fixed to the mold frame 16, and the liquid crystal display panel 4, a light guide plate 18, a reflective plate 20 and optical sheets 10 are fixed to and supported by a step unit formed in the inner side surface of the mold frame 16. The bottom chassis 22 is fixed to the mold frame 16 in the lower side and outer side surface thereof as shown in FIG. 2 and an opening is formed in the part of the bottom chassis 22 such that a light emitting display panel 30 can be inserted therein.

The second printed circuit board 26 is supplied with the drive signal from a drive circuit (not shown) located in the mobile phone side and includes a mobile phone connector 28. The mobile phone connector 28 is combined with and fixed to another connector attached to the drive circuit located in the mobile phone side to be supplied with the drive signal from the drive circuit located in the mobile phone side. The second printed circuit board 26 supplied with the drive signal generates various control signals corresponding to the drive signal.

The first printed circuit board 24 is connected to the second printed circuit board 26 through a first pad unit 38 provided in the second printed circuit board 26. Additionally, the first printed circuit board 24 is connected to the integrated circuit 6 of the first liquid crystal display panel 4 and LED substrate 14 by a flexible printed circuit board (not shown). The first printed circuit board 24 connected to the integrated circuit 6 and LED substrate 14 drives the integrated circuit 6 and LED substrate 14 corresponding to the control signals supplied from the second printed circuit substrate 26.

The light emitting display panel 30 includes a first substrate 30a and a second substrate 30b. Organic LEDs (not shown) are arranged on the first substrate 30a in matrix form. The organic LEDs generate a predetermined amount of light corresponding to the amount of current supplied. The light emitting display panel 30 is connected to the second printed circuit board 26 by the second pad unit 36 of the flexible printed circuit board 32. An integrated circuit 34 is mounted on the flexible printed circuit board 32. The integrated circuit 34 lets the light emitting display panel 30 display a predetermined image in response to the control signals supplied from the second printed circuit board 26.

The portable display device may be exposed to various environments, making the display device susceptible to being impacted from the outside. Due to the recent trend of smaller and slimmer portable display devices, portable display devices are more likely to be damaged by impact. Thus, there is a need for a stiffer portable display device.

SUMMARY OF THE INVENTION

Accordingly, a portable display device is provided having enhanced stiffness due to a bottom chassis formed to surround the upper side and inner side surface of a mold frame.

A portable display device includes a display panel, a backlight assembly having a light source for supplying light to the display panel and having a mold frame with a periphery step platform. The periphery step platform has peripheral side walls and a step portion, the peripheral side walls having an outer sidewall surface, a top sidewall surface and an inner sidewall surface, the step portion having a step portion top surface and a step portion side surface. The portable display device also includes a bottom chassis supporting the mold frame, the bottom chassis having a peripheral bent unit enclosing the outer sidewall surface, the top sidewall surface, the inner sidewall surface and the step portion top surface. The bent unit may also be formed to enclose the outer sidewall surface, the top sidewall surface, the inner sidewall surface, the step portion top surface and the step portion side surface.

The bottom chassis is formed of Steel Use Stainless (SUS) material. The bottom chassis has 0.1 mm to 0.2 mm in thickness. The backlight assembly is configured to include LEDs as a light source, a LED substrate, a light guide plate, a reflective plate and optical sheets. The portable display device of the present invention further includes a second printed circuit board connected to an external drive circuit, a first printed circuit board connected to the second printed circuit board, the first printed circuit board controlling the liquid crystal display panel and light source, and a light-emitting display panel connected to the second printed circuit board in the lower side thereof, the light-emitting display panel displaying images.

DETAILED DESCRIPTION

Figure 1:
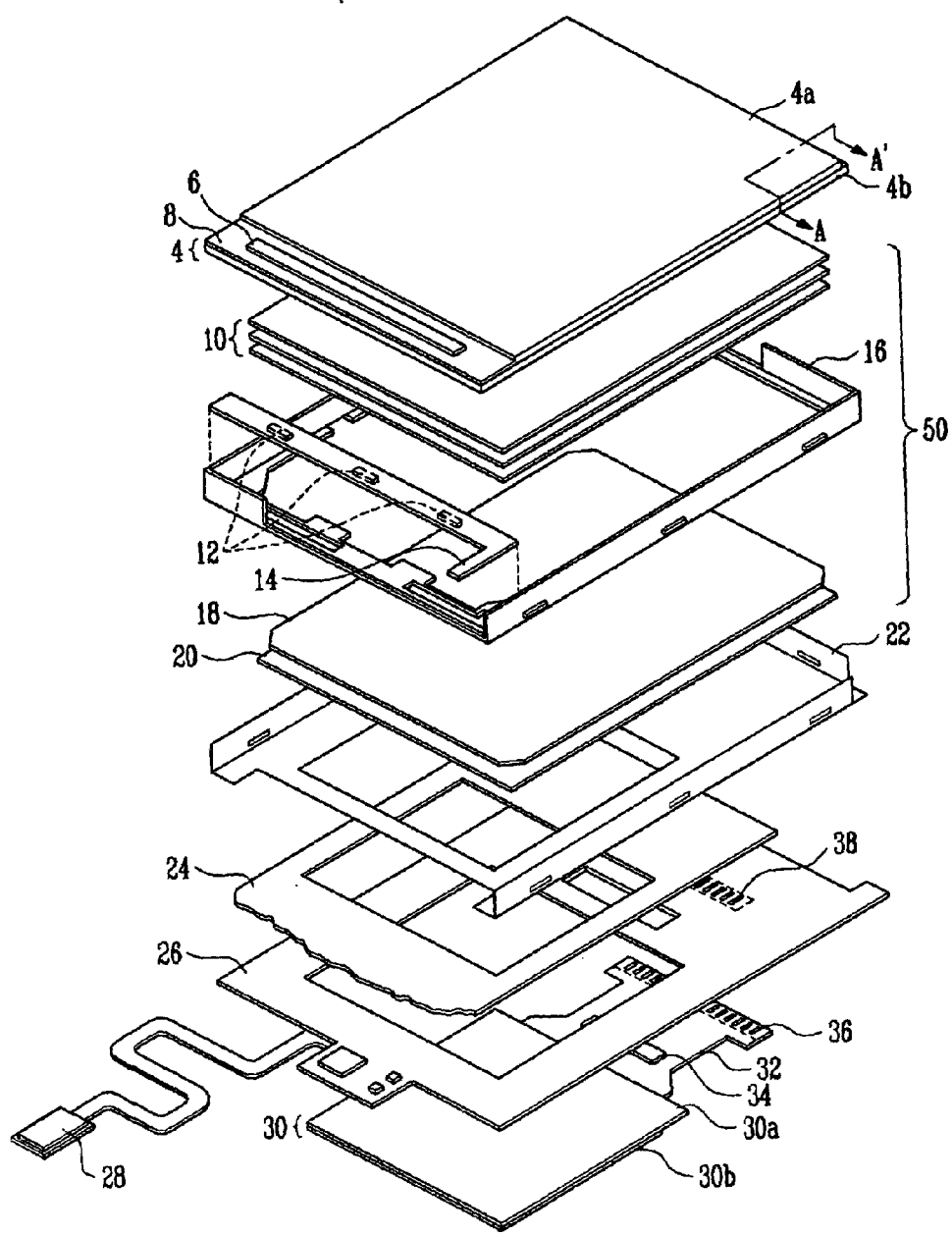
FIG. 1 is an exploded prospective view illustrating a conventional portable display device.
Figure 2:
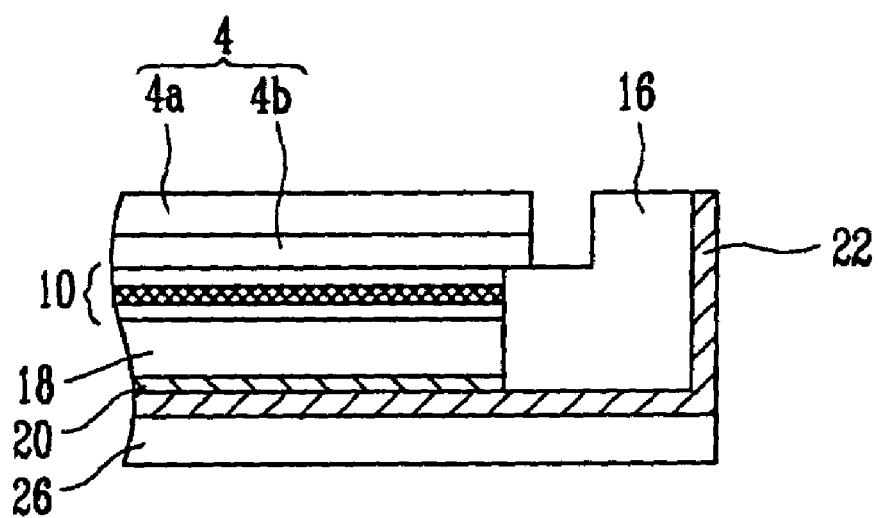
FIG. 2 is an assembled sectional view taken along line A-A' of the portable display device shown in FIG. 1.
Figure 3:
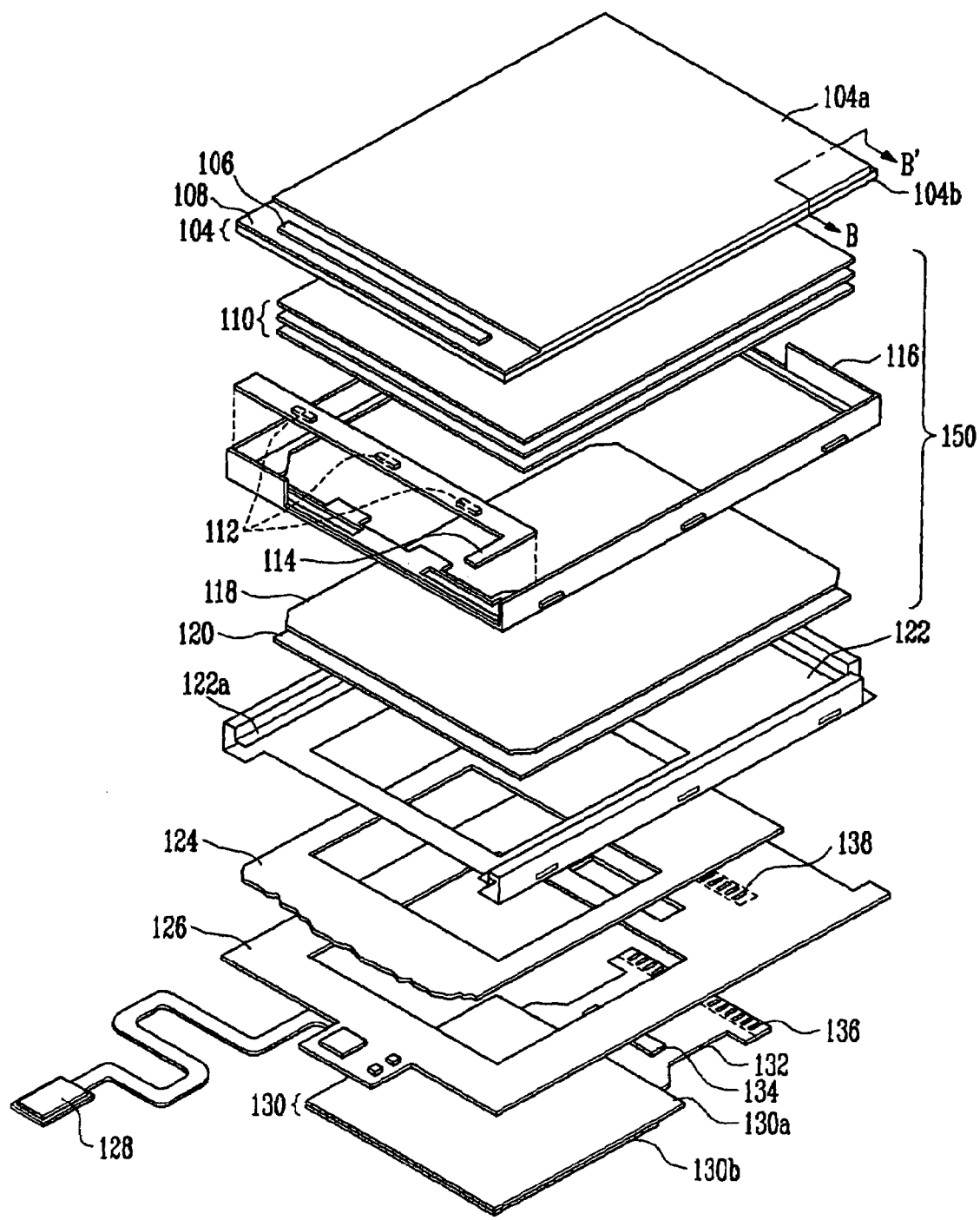
FIG. 3 is an exploded prospective view illustrating a portable display device according to an embodiment of the present invention.
Figure 4:
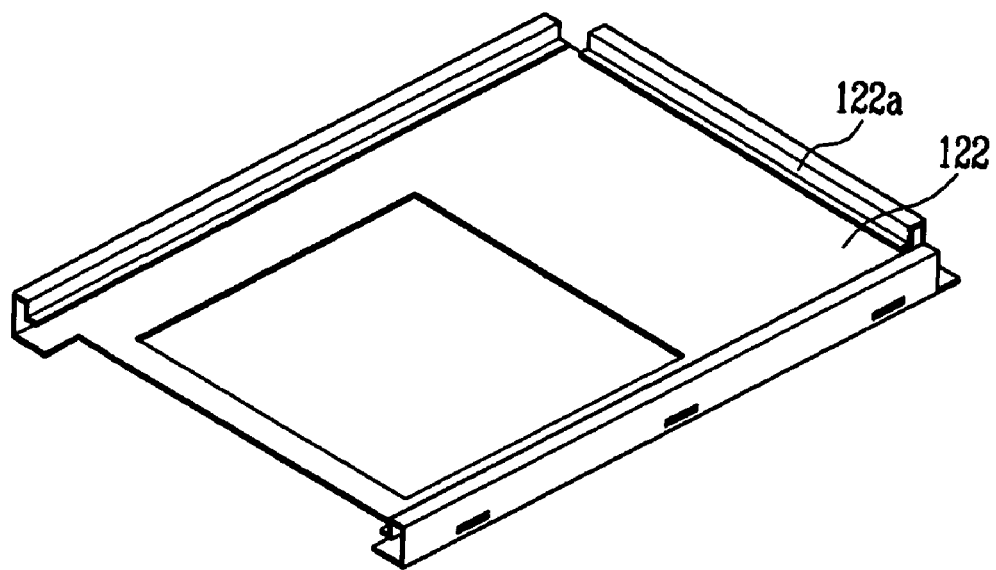
FIG. 4 is a view for illustrating an embodiment of a bottom chassis shown in FIG. 3.
Figure 5:
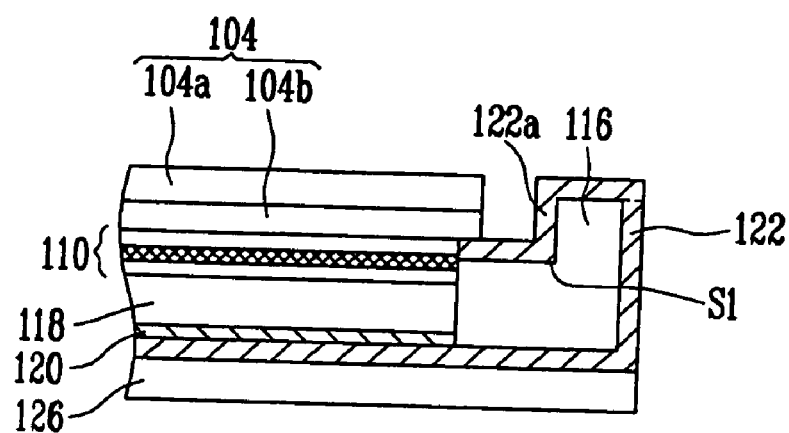
FIG. 5 is an assembled sectional view taken along line B-B' of the portable display device of FIG. 3, having the bottom chassis shown in FIG. 4.

Referring to FIGS. 3, 4 and 5, a portable display device according to an embodiment of the present invention includes a liquid crystal display panel 104, a backlight assembly 150, a bottom chassis 122, a first printed circuit board 124, a second printed circuit board 126, and a light-emitting display panel 130. The bottom chassis 122 may be formed so as to surround the upper side and the step unit S1 of the inner side surface of a mold frame 116 included in the backlight assembly 150.

The liquid crystal display panel 104 displays images and includes a first substrate 104a, a second substrate 104b and a liquid crystal (not shown) injected between the first substrate 104a and the second substrate 104b.

The second substrate 104b includes a plurality of TFTs arranged in matrix form. A source electrode of the TFT is connected to a data line, and a gate electrode thereof is connected to a scan line. A drain electrode of the TFT is connected to a pixel electrode made of transparent ITO. The TFT is turned on when the scan line is supplied with a scan signal, and supplies a data signal from the data line to the pixel electrode.

An integrated circuit 106 is inserted to one side of the second substrate 104b, and the data signal and scan signal are supplied from the integrated circuit 106. A protective layer 108 is deposited around the integrated circuit 106.

The first substrate 104a is arranged facing the second substrate 104b. A common electrode made of ITO is applied on the front surface of the first substrate 104a. The common electrode is applied with a predetermined voltage, and thus a predetermined electric field is generated between the common electrode and the pixel electrode. The array angle of the liquid crystal injected between the first substrate 104a and the second substrate 104b varies with the electric field. The optical transparency also may vary according to the array angle to thereby display desired images.

The backlight assembly 150 includes a mold frame 116, LEDs 112, a LED substrate 114, a light guide plate 118, a reflective plate 120 and optical sheets 110. The LEDs 112 emit a predetermined amount of light corresponding to a drive signal from the LED substrate 114. The light guide plate 118 supplies the light from the LEDs 112 to the liquid crystal display panel 104.

The reflective plate 120, located on a rear surface of the light guide plate 118, supplies incidence light from the light guide plate 118 back to the light guide plate 118 thereby improving optical efficiency.

The optical sheets 110 enhance the brightness of light from the light guide plate 118 to supply light to the liquid crystal display panel 104. The LED substrate 114, which is connected to the first printed circuit board 124, supplies the drive signal to the LEDs 112 corresponding to control signal from the first printed circuit board 124.

The LED substrate 114 mounted with LEDs 112 is received in and fixed to the mold frame 116, and the liquid crystal display panel 104 and backlight assembly 150 are fixed and supported in the mold frame 116. A step unit S1 is formed in the inner side surface of the mold frame 116 and the bottom chassis 122 is combined with the mold frame 116 in the lower side and side surface thereof. An opening is formed in the part of the bottom chassis 122 such that a light emitting display panel 130 is insertable therein.

The bottom chassis 122 of the present invention may surround the upper side and step unit S1 of the inner side surface of the mold frame 116. More specifically, the bottom chassis 122 is provided with a bent unit 122a extending from the side surface thereof and formed to correspond to the upper side and inner side surface formed with a step unit S1 of the mold frame 116.

The second printed circuit board 126 includes a mobile phone connector 128 and is supplied with the drive signal from a drive circuit (not shown) located in the mobile phone side. The mobile phone connector 128 is fixed to another connector attached to the drive circuit located in the mobile phone side to thus be supplied with the drive signal from the drive circuit located in the mobile phone side. The second printed circuit board 126 supplied with the drive signal generates various control signals corresponding to the drive signal.

The first printed circuit board 124 is connected to the second printed circuit board 126 through a first pad unit 138 formed in the second printed circuit board 126. The first printed circuit board 124 is connected to the integrated circuit 106 of the liquid crystal display panel 104 and LED substrate 114 by a flexible printed circuit board (not shown). The first printed circuit board 124 connected to the integrated circuit 106 and LED substrate 114 drives the integrated circuit 106 and LED substrate 114 corresponding to the control signals supplied from the second printed circuit substrate 126.

The light emitting display panel 130 includes a first substrate 130a and a second substrate 130b. Organic LEDs (not shown) are arranged on the first substrate 130a in matrix form. The organic LEDs generate a predetermined amount of light corresponding to the amount of current supplied. The light emitting display panel 130 is connected to the second printed circuit board 126 by the second pad unit 136 of the flexible printed circuit board 132. An integrated circuit 134 is mounted on the flexible printed circuit board 132. The integrated circuit 134 allows the light emitting display panel 130 display a predetermined image in response to the control signals supplied from the second printed circuit board 126.

In the above mentioned portable display device, the bottom chassis 122 surrounds the upper side and step unit of the inner side surface of the mold frame 116 and thereby enhances the combination with the mold frame 116 and protects the mold frame 116.

Referring to FIGS. 4 and 5, the bottom chassis 122 according to a first embodiment of the present invention is configured to be combined to the lower side and side surface of the mold frame 116. The bottom chassis 122, which serves to fix the backlight assembly 150 and liquid crystal display panel 104 along with a top chassis (not shown), is generally form of SUS material having, in one exemplary embodiment, a thickness of between about 0.1 mm to 0.2 mm.

Because the portable display device according to an embodiment of the present invention is embodied in a dual type, an opening is formed in the middle surface of the bottom chassis 122 so that the light-emitting display panel 130 can be inserted therein.

The bottom chassis, which also called a bezel, is formed to surround the upper side and step unit S1 of the inner side surface, as well as the lower side and the outer side surface of the mold frame 116 in the embodiment. The bottom chassis 122 is provided with a bent unit 122a extending from a side surface of the bottom chassis and formed to correspond to the bent part between the upper side and the first step unit S1 of the mold frame 116.

As mentioned above, the side surface part of the bent unit 122a is formed to surround the upper side and step unit of the inner side surface of the mold frame 116 and thus enhances the combination with the mold frame 116 and the like, and protects the mold frame 116.

Figure 6:
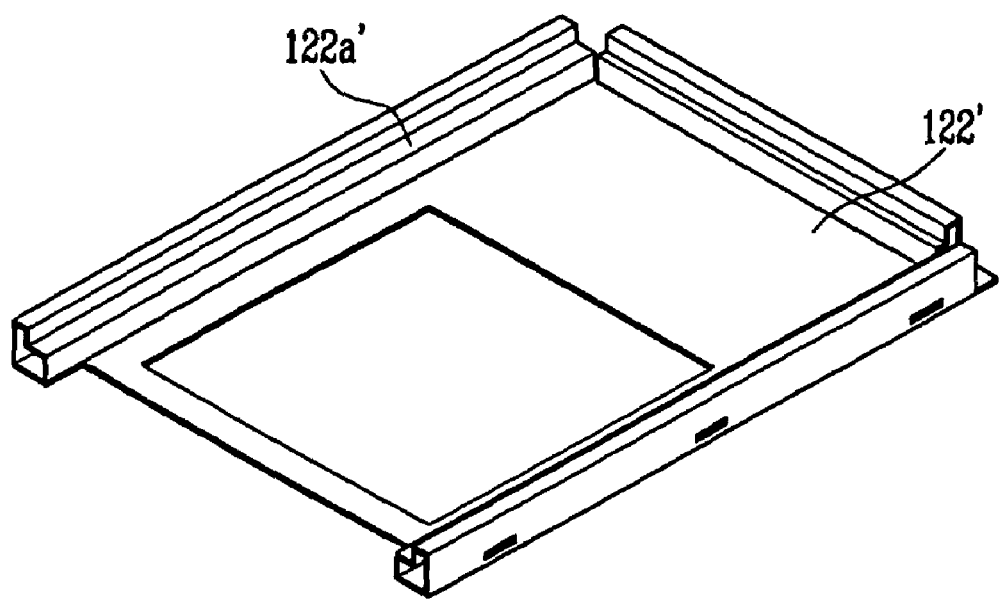
FIG. 6 is a view for illustrating another exemplary embodiment of the bottom chassis shown in FIG. 3.
Figure 7:
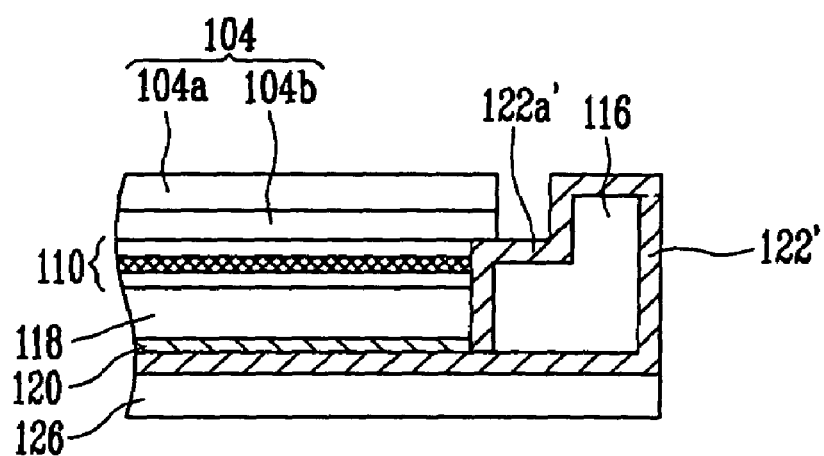
FIG. 7 is an assembled sectional view taken along line B-B' of the portable display device of FIG. 3 having the bottom chassis shown in FIG. 6.

The bottom chassis 122' may also be formed to surround the entire inner side surface as well as the step unit S1 of the mold frame 116, as shown in FIGS. 6 and 7 by being extended. Thus, the bent unit 122a' is formed to surround the entire inner side surface of the mold frame 116 receiving the optical sheets 110, the light guide plate 118, and the reflective plate 120. As shown in FIGS. 6 and 7, the bent unit 122a' of the bottom chassis 122' is in contact with the bottom surface of the bottom chassis, but is not adhered thereto. Since the bottom chassis 122' is flexible and the bent unit 122a' is separable from the bottom surface, the mold frame 116 is insertable into the bottom chassis by force.

As mentioned above, in a portable display device of the present invention, the stiffness of the portable display device is enhanced by being provided with a bottom chassis formed to surround the upper side and inner side surface of a mold frame.

Although exemplary embodiments of the present invention have been shown and described, it will be appreciated by those skilled in the art that changes might be made in this embodiment without departing from the principles and spirit of the invention, the scope of which is defined in the claims and their equivalents.

What is claimed is:

1. A portable display device comprising:
   a display panel;
   a backlight assembly having a light source for supplying light to the display panel and having a mold frame defining a periphery step platform extending along substantially an entire length of each of a plurality of edges of the mold frame for supporting the display panel; and
   a bottom chassis supporting the mold frame, the bottom chassis defining a peripheral bent unit, wherein the peripheral bent unit continuously extends along each of a plurality of edges of the bottom chassis and surrounds an entirety of the peripheral step platform.

2. The portable display device as claimed in claim 1, wherein the bottom chassis comprises Steel Use Stainless material.

3. The portable display device as claimed in claim 1, wherein the bottom chassis has a thickness of between about 0.1 mm to 0.2 mm.

4. The portable display device as claimed in claim 1, wherein the backlight assembly comprises:
   light emitting diodes on a light emitting substrate supported by and fixed to the mold frame,
   a light guide plate and a reflective plate between the mold frame and the bottom chassis; and
   optical sheets between the display panel and the mold frame.

5. The portable display device as claimed in claim 1, further comprising:
   a second printed circuit board connected to an external drive circuit;
   a first printed circuit board connected to the second printed circuit board, the first printed circuit board controlling the display panel and light source; and
   a light-emitting display panel connected to the second printed circuit board for displaying images.

6. The portable display device as claimed in claim 1, wherein the display panel is a liquid crystal display panel.

* * * * *

UNITED STATES PATENT AND TRADEMARK OFFICE
CERTIFICATE OF CORRECTION

PATENT NO. : 7,586,556 B2 Page 1 of 1
APPLICATION NO. : 11/545981
DATED : September 8, 2009
INVENTOR(S) : Young Min You et al.

It is certified that error appears in the above-identified patent and that said Letters Patent is hereby corrected as shown below:

On the Title Page

(73) Assignee                              Insert -- Display -- after Mobile

Signed and Sealed this

Tenth Day of August, 2010

David J. Kappos
*Director of the United States Patent and Trademark Office*